US012287497B2

(12) United States Patent
Freeman

(10) Patent No.: US 12,287,497 B2
(45) Date of Patent: Apr. 29, 2025

(54) DIFFUSER SCREEN

(71) Applicant: BAE SYSTEMS plc, London (GB)

(72) Inventor: Jonathan Paul Freeman, Rochester (GB)

(73) Assignee: BAE SYSTEMS PLC, London (GB)

( * ) Notice: Subject to any disclaimer, the term of this patent is extended or adjusted under 35 U.S.C. 154(b) by 187 days.

(21) Appl. No.: 18/001,104

(22) PCT Filed: Jun. 4, 2021

(86) PCT No.: PCT/GB2021/051390
§ 371 (c)(1),
(2) Date: Dec. 8, 2022

(87) PCT Pub. No.: WO2021/250379
PCT Pub. Date: Dec. 16, 2021

(65) Prior Publication Data
US 2023/0213691 A1 Jul. 6, 2023

(30) Foreign Application Priority Data

Jun. 8, 2020 (GB) ...................................... 2008578
Jul. 20, 2020 (EP) ...................................... 20275122

(51) Int. Cl.
G02B 5/02 (2006.01)
G02B 27/01 (2006.01)

(52) U.S. Cl.
CPC ......... *G02B 5/0273* (2013.01); *G02B 5/0205* (2013.01); *G02B 27/0101* (2013.01)

(58) Field of Classification Search
CPC ................ G02B 5/0273; G02B 5/0205; G02B 27/0101; G02B 5/0278; G02B 6/08;
(Continued)

(56) References Cited

U.S. PATENT DOCUMENTS 4,601,537 A * 7/1986 Saccocio .................. G02B 6/08
385/115
5,321,251 A * 6/1994 Jackson ................. G02B 27/46
250/227.28
(Continued)

FOREIGN PATENT DOCUMENTS

GB 841200 A 7/1960
JP H05326906 A 12/1993
(Continued)

OTHER PUBLICATIONS

International Search Report and Written Opinion received for PCT/GB2021/051390. Mail date: Jul. 21, 2021. 18 pages.
(Continued)

*Primary Examiner* — John Bedtelyon
(74) *Attorney, Agent, or Firm* — Finch & Maloney PLLC

(57) ABSTRACT

A optical apparatus to display an image to a user is disclosed. The apparatus comprises an image source to generate an image bearing light beam having a first numerical aperture; and a diffuser screen. The diffuser screen is configured to increase the numerical aperture of the image bearing light beam to a second numerical aperture. The diffuser screen comprises a first part comprising: a first face and second face substantially parallel to each other, a first array of a plurality of waveguides forming an optical path between the first face and the second face. A value of an optical property of each of the plurality of waveguides is selected randomly from a set of values of the optical property. The first array of a plurality of waveguides is arranged such that each of the plurality of waveguides has an optical axis that is substantially parallel to it's nearest neighbour. Substantially all the waveguides of the first array are sized below a size that would allow a single mode of visible light to propagate along each waveguide.

24 Claims, 14 Drawing Sheets

(58) Field of Classification Search
CPC ...... G02B 6/065; G02B 5/02; G02B 6/02042; G02B 6/06
See application file for complete search history.

(56) References Cited

U.S. PATENT DOCUMENTS

| | | | |
|---|---|---|---|
| 5,479,550 | A | 12/1995 | Nishioka et al. |
| 6,041,154 | A | 3/2000 | Ono et al. |
| 10,488,584 | B2 | 11/2019 | Karafin et al. |
| 10,551,628 | B2 | 2/2020 | Karafin et al. |
| 2005/0058414 | A1 | 3/2005 | Kochergin |
| 2015/0070750 | A1 | 3/2015 | Hong et al. |
| 2018/0128973 | A1 | 5/2018 | Powell et al. |

FOREIGN PATENT DOCUMENTS

| | | |
|---|---|---|
| JP | H06319093 A | 11/1994 |
| JP | H07270715 A | 10/1995 |
| JP | 2000193909 A | 7/2000 |
| JP | 2019523445 A | 8/2019 |
| JP | 2019530889 A | 10/2019 |
| WO | 2011040346 A1 | 4/2011 |
| WO | 2015136258 A1 | 9/2015 |
| WO | 2017075175 A2 | 5/2017 |
| WO | 2019112629 A1 | 6/2019 |
| WO | 2021250379 A1 | 12/2021 |

OTHER PUBLICATIONS

Combined Search and Examination Report under Sections 17 and 18(3) received for GB App. No. 2108041.1, dated Nov. 16, 2021. 8 pages.

Extended European Search Report received for EP App. No. 20275122.8, dated Jan. 22, 2021. 10 pages.

Karbasi, et al., "Image transport using Anderson localized modes in disordered optical fibers," Proceedings of SPIE, IEEE, vol. 8992. Mar. 8, 2014. pp. 89920J-1-89920J-9.

Mafi, et al., "Disordered Anderson Localization Optical Fibers for Image Transport—A Review," Journal of Lightwave Technology, vol. 37, No. 22. Nov. 15, 2019. pp. 5652-5659.

* cited by examiner

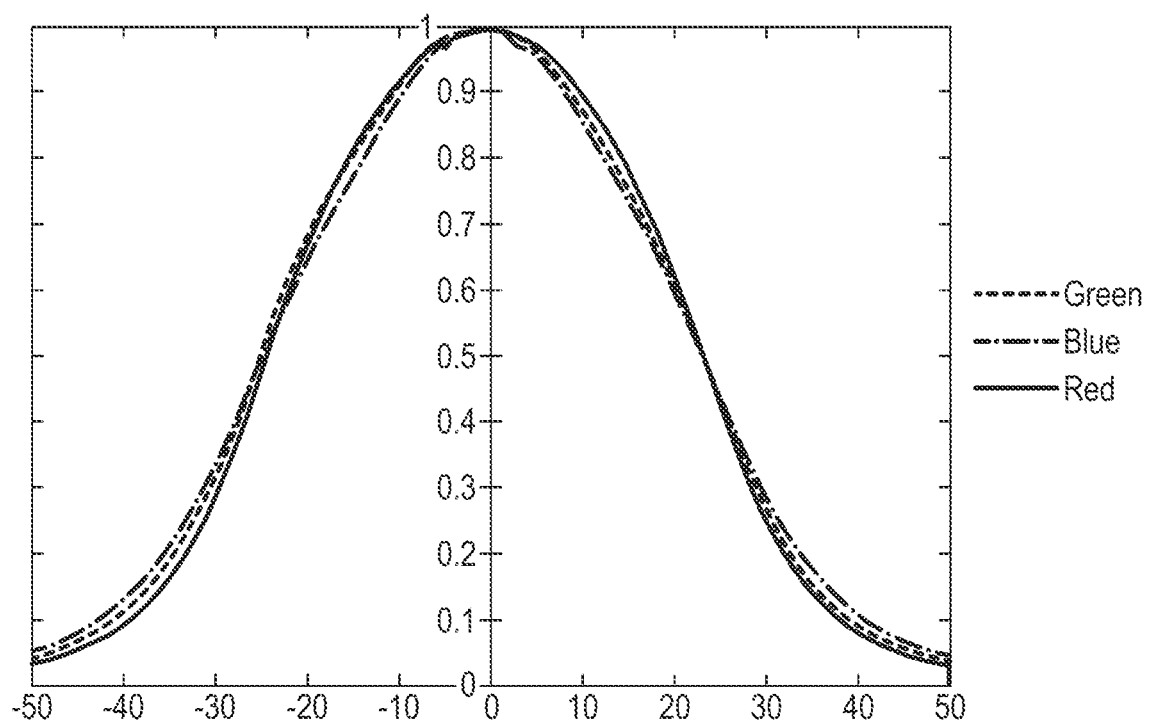

DIFFUSER SCREEN

BACKGROUND

Diffuser screens may be used in displays to scatter/diffuse light to more evenly distribute light and increase the numerical aperture (NA) of an image beam.

BRIEF DESCRIPTION OF DRAWINGS

FIG. 10D illustrates a plot of cone angles for green, blue and red light against normalised power for a test screen.

DETAILED DESCRIPTION

Figure 1A:
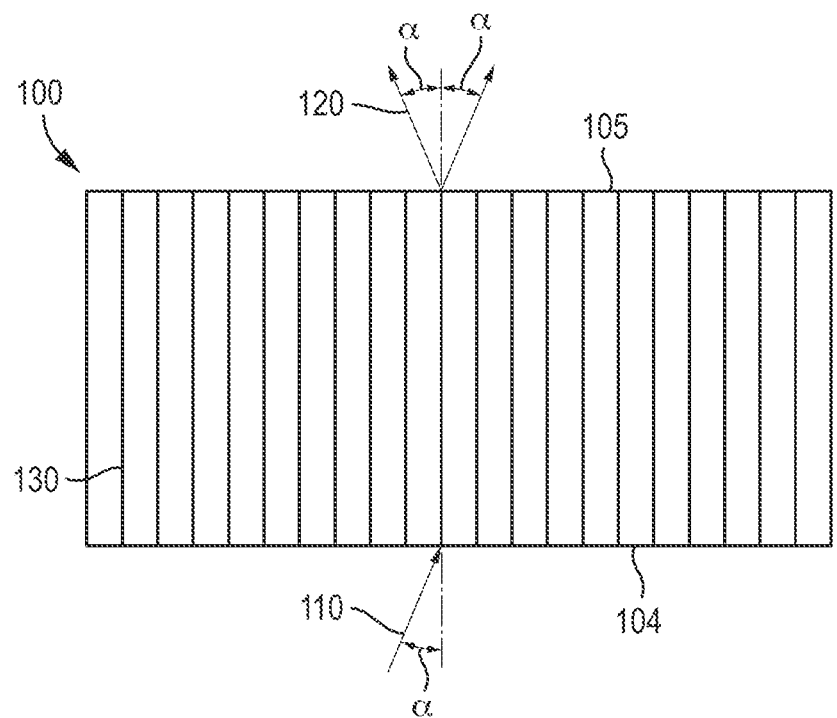
FIG. 1A is an illustration of a fibre faceplate.

In some applications, such as a head up display, a fibre faceplate may be used as part of a screen to display an image to a user. A fibre faceplate transfers an image from an input face to an output face. An example of a fibre faceplate 100 is illustrated in FIG. 1A. Fibre faceplate 100 comprises a plurality of waveguides 130 forming an optical path between a second face 105 and a first face 104. Each waveguide 130 may comprise an optical fibre of a sufficient size to allow at least a single mode of visible light to travel down the fibre without significant attenuation in the fibre by total internal reflection. In most examples the waveguides are multimode fibres, such that many modes are permitted in the fibres. Each waveguide 130 is also substantially similar to each other waveguide and substantially parallel to each other.

Input light 110 may be input into the diffuser at an angle α to a normal of the first face 104. The input light propagates along an optical axis of the array of waveguides. Output light 120 is output in a cone of light about a normal to the second face 105.

Figure 1B:
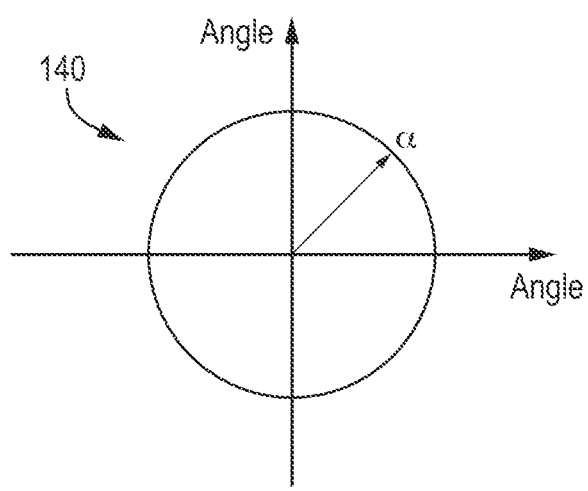
FIG. 1B illustrates an output cone angle from the fibre faceplate.

FIG. 1B illustrates a projection 140 of the cone onto a plane that is perpendicular to the normal of the second face 105. As can be seen in FIG. 1B, the cone forms a ring of light, such that light input 110 in a straight line in a single direction is output in a cone of angle α.

Figure 2A:
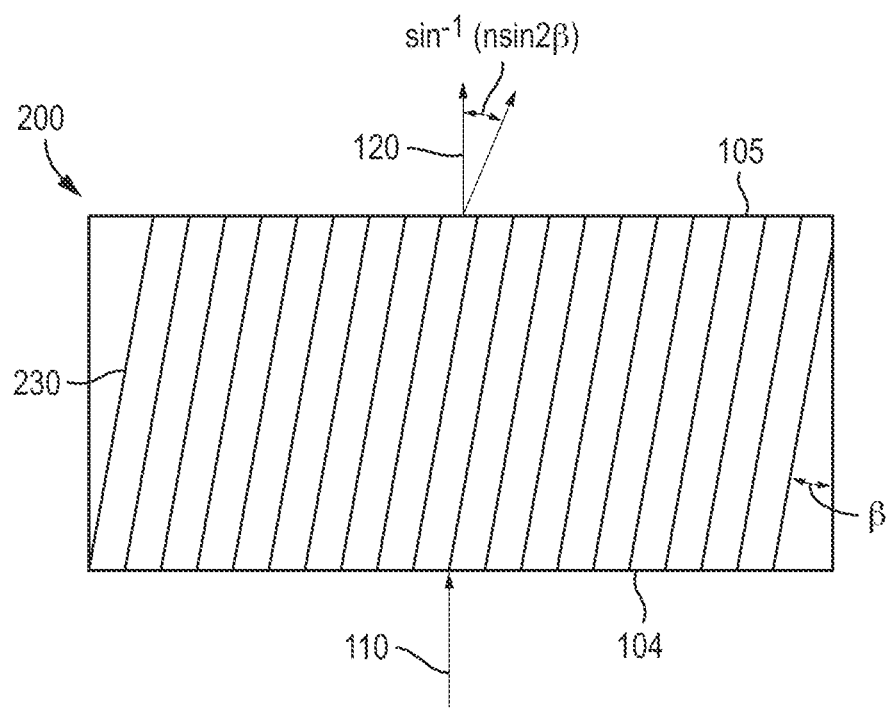
FIG. 2A is an illustration of an angled fibre faceplate.

FIG. 2A illustrates an angled fibre faceplate 200. Angled fibre faceplate 200 comprises a plurality of angled waveguides 230 forming an optical path between a first face 104 and a second face 105. The plurality of angled waveguides 230 are at an angle β with respect to a normal to the first face 104 or second face 105. Each angled waveguide 230 is also substantially similar to each other waveguide and substantially parallel to each other.

Input light 110 may be input normal to the surface of the first face 104. Output light 120 is output in a cone of angle $\sin^{-1}(n \sin 2\beta)$, where n is the refractive index of the waveguide.

Figure 2B:
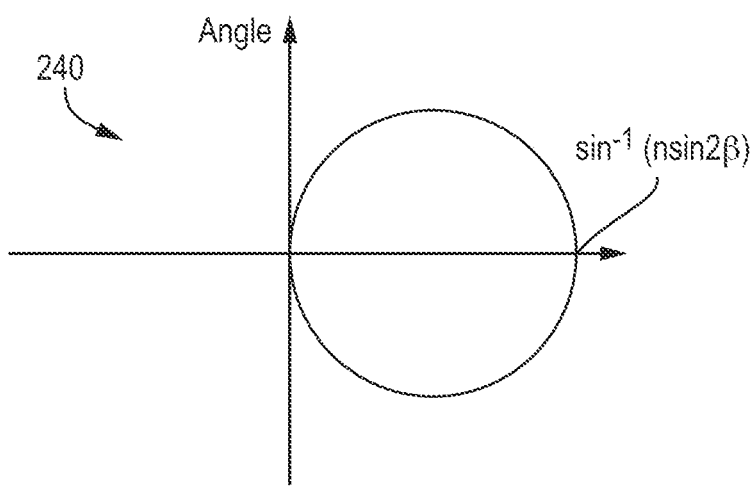
FIG. 2B illustrates an output cone angle from an angled fibre faceplate.

As illustrated by FIG. 2B, a consequence of the waveguides 230 not being perpendicular to the surface of the first face 104 is that the cone 120 is shifted relative to the case where the waveguides are perpendicular to the surface of the first face 104. This may allow for a display to be tilted or have an angular offset relative to the fibre face plate rather than directly in front of the second face 105.

However, in both examples of FIGS. 1A and 2A light is emitted in a cone around a central axis. In some situations it may be desirable to have the light emitted in a solid cone, rather than a ring. If a fibre faceplate is used then a separate diffuser may be used to diffuse the image over the entire cone angle, i.e. increase the numerical aperture of the output beam compared to the numerical aperture of the input beam. Otherwise the image displayed to the user would be patchy, as a consequence of the light being emitted in a cone of light is that not all parts of the screen would be illuminated or would be illuminated non-uniformly. This also may reduce the quality of the image displayed to the user or extra elements may be required to mitigate this effect.

In this disclosure it has been identified that a fibre face plate screen utilising transverse Anderson localization may enable light to be emitted from the fibre in a solid cone, rather than a ring, and substantially independent of wavelength providing diffusion and removing the requirement for a separate diffuser screen. This is beneficial where even illumination may be desired over an appreciable cone angle. Transverse Anderson localization is described in "*Transverse Anderson localization of light: a tutorial review*, Arash Mafi, arXiv:1505.01109v2 [physics.optics] 4 Jun. 2015".

The use of a fibre faceplate utilising transverse Anderson localization may lead to a more uniform image and allow a user to see a higher quality image without the use of a separate fibre face plate. Transverse Anderson localization may cause the absence of diffusion in the axis perpendicular to the optical axis of the waveguides in a system due to the presence of a disordered system. The optical axis is defined by the direction of propagation of light in the waveguide. In a conventional fibre waveguide the optical axis is the same as the longitudinal axis and the direction perpendicular is the transverse axis of the fibre waveguide.

In the example of a fibre faceplate, disorder may be added to the system by arranging waveguides having different optical properties such as randomly choosing the waveguide size from a set of different sizes of waveguide (e.g. width), or a set of different refractive indexes.

Figure 3A:
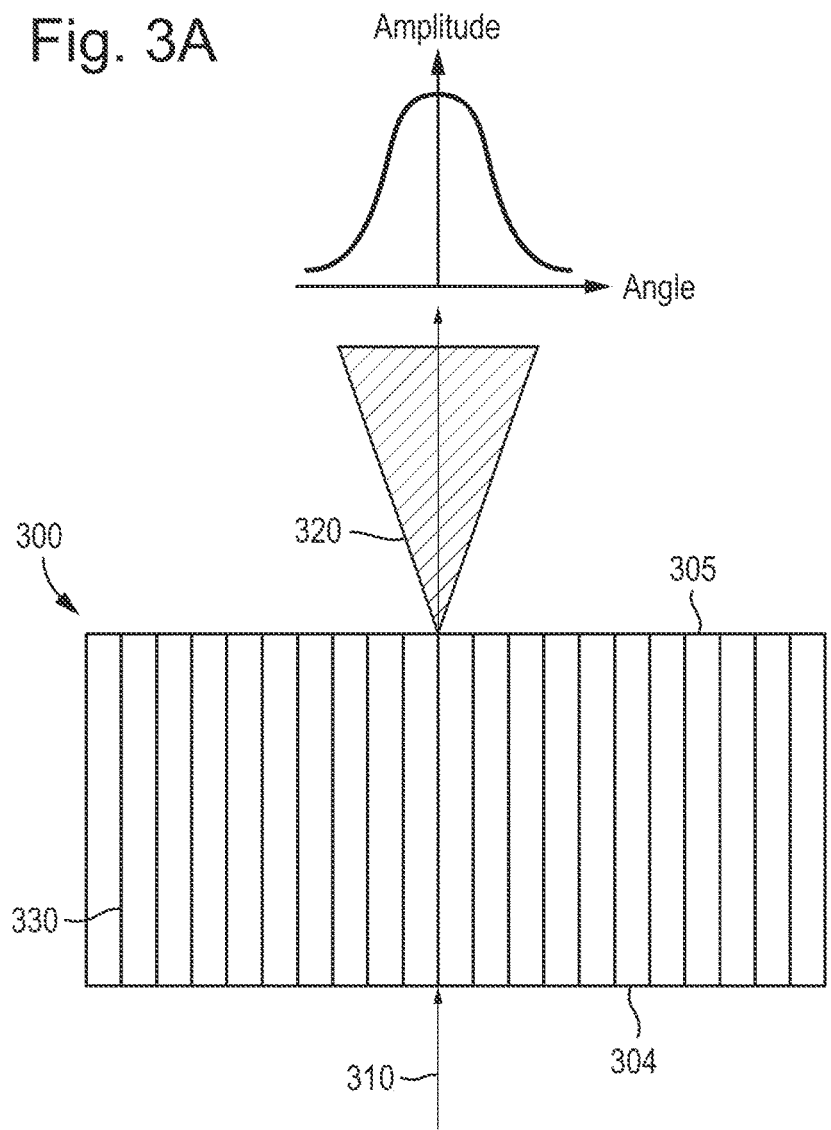
FIG. 3A illustrates a transverse Anderson localisation diffuser screen in accordance with some examples.

An example of a transverse Anderson localization (TAL) diffuser screen 300 according to some examples is illustrated in FIG. 3A. The TAL diffuser screen 300 comprises a first face 304 and a second face 305 substantially parallel to the first face 304. Input light 310 is input into the TAL diffuser screen 300 via the first face 304, and output light 320 is emitted from second face 305.

The TAL diffuser screen 300 comprises a plurality of waveguides 330 arranged in an array. The plurality of optical waveguides 330 form an optical path between the first face 304 and the second face 305. The optical axis of each of the plurality of waveguides 330 are arranged substantially perpendicular to the plane of the first face 304 and/or the first face 305. A value of an optical property of each of the waveguides in the array is selected at random from a set of values. In some examples the set of values may consist of two values, however any number of values may be appropriate. In some examples the value may be selected from a random continuous distribution of values or from predetermined discrete values.

The size of each individual waveguide is below the size that would allow a single optical mode to propagate along the waveguide if the waveguide was used in isolation. However, due to the structure of the TAL diffuser screen 300 and the disorder added by randomly choosing an optical property of each waveguide, the output light 320 propagates through the TAL diffuser screen 300 without significant attenuation and is emitted in a roughly Gaussian distribution of angles around a direction substantially parallel with the direction of propagation in the waveguides (i.e the optical axis of the waveguides), as shown in FIG. 3A and FIG. 3B.

Figure 3B:
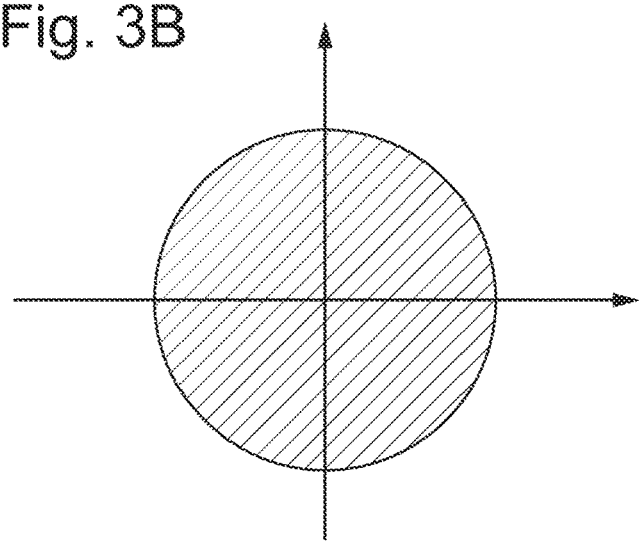
FIG. 3B illustrates an output cone angle from a transverse Anderson localisation angled diffuser screen.

The input angle is still nominally conserved, as with a fibre faceplate 100, however the output ray angles are effectively convolved with a Gaussian profile, to produce the profile as shown in FIG. 3B. As can be seen from FIG. 3B the output is a solid cone, however in some examples the output may be a donut shape depending on the width of the Gaussian profile or cone angle, as if the Gaussian profile is sufficiently wide or the cone angle sufficiently small then the middle may be filled.

Figure 4A:
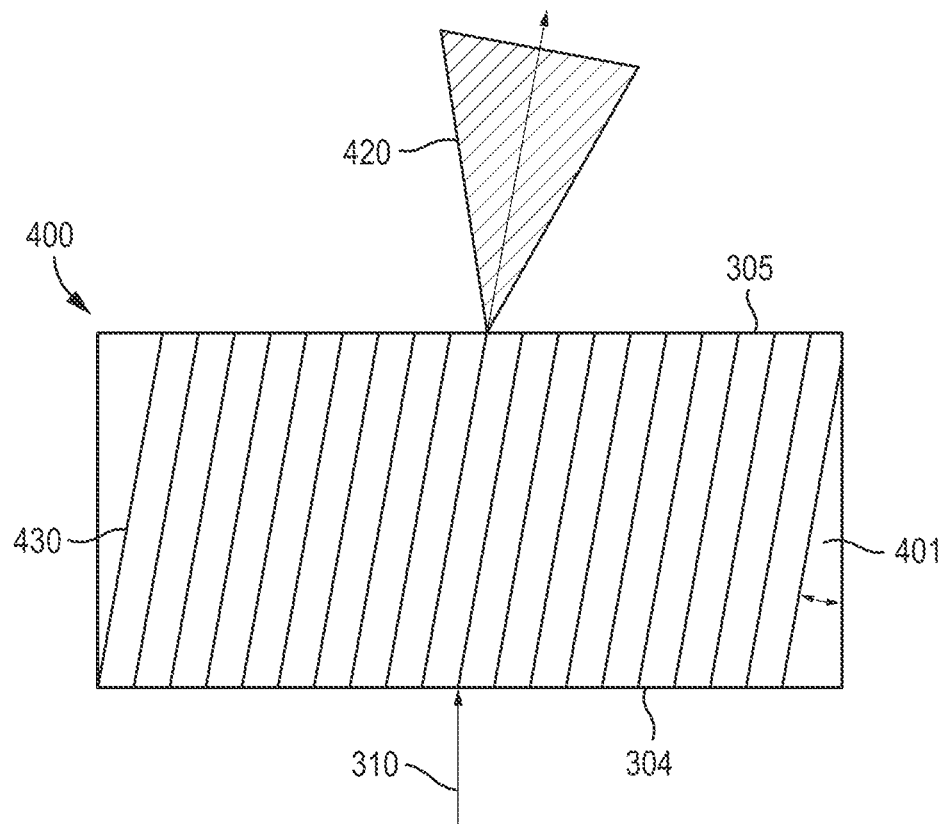
FIG. 4A illustrates an angled transverse Anderson localisation diffuser screen in accordance with some examples.

FIG. 4A illustrates an offset TAL diffuser screen 400. The arrangement of the offset TAL diffuser screen 400 is similar to the arrangement of the TAL diffuser screen 300 illustrated in FIG. 3A, except that the optical axis of each of the plurality of waveguides are arranged at an angle 401 relative to a normal of one of the surfaces of first face 304 and second face 305, and similar features are illustrated with the same reference numeral.

Figure 4B:
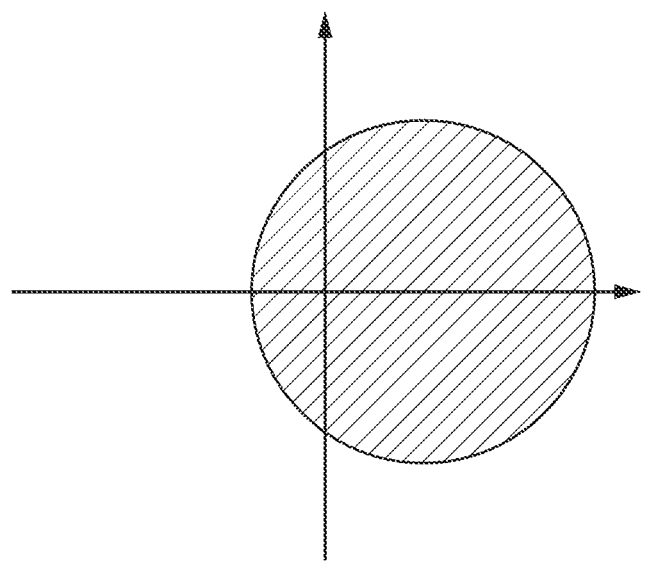
FIG. 4B illustrates an output cone angle from an angled transverse Anderson localisation angled diffuser screen.

Input light 310 is input normal to the surface of the first face 304 of the offset diffuser screen 400. Light propagates through a plurality of offset waveguides 430 arranged in an array. The light is emitted substantially parallel with the optical axis of the offset waveguides as offset output light 420. Offset output light 420, like output light 320, is output with ray angles that are effectively convolved with a Gaussian profile, to produce the profile as shown in FIG. 4B. the output profile may be a Gaussian distribution, or a Gaussian-like distribution such as a top-hat distribution or a super Gaussian distribution.

In some examples the input cone angle may be ±3° and the output cone angle may be ±12°.

Figure 5A:
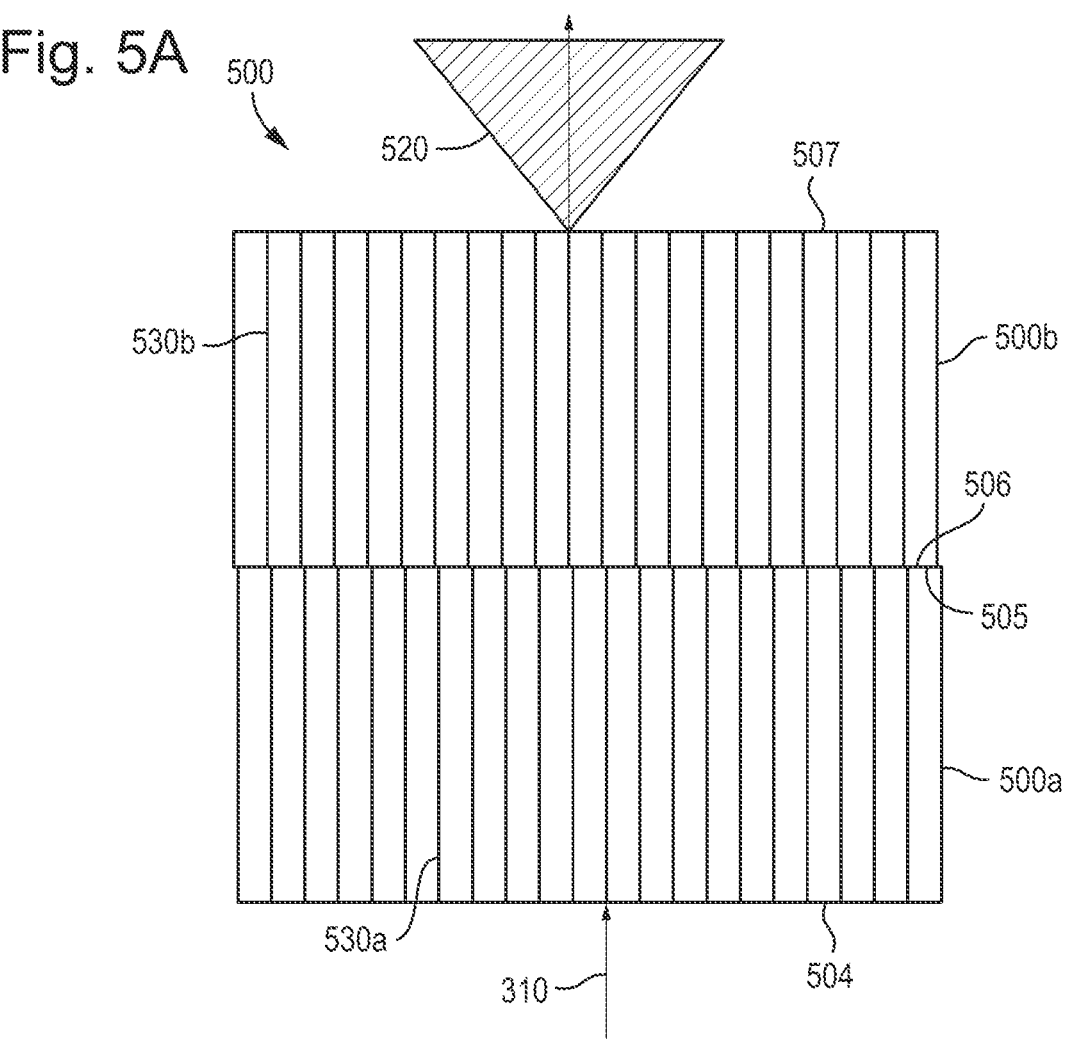
FIG. 5A illustrates a double transverse Anderson localisation diffuser screen in accordance with some examples.

The width of the Gaussian distribution may be increased by coupling two TAL diffuser screens together such that the output of one TAL diffuser screen is the input into another TAL diffuser screen. The TAL diffuser screens are similar to those described with relation to FIG. 3A. Coupling two diffuser screens together results in a double TAL diffuser screen 500. The double TAL diffuser screen 500 is illustrated in FIG. 5A.

Double TAL diffuser screen 500 comprises two parts, a first part 500a and a second part 500b. Each first part 500a and second part 500b may be substantially similar to the TAL diffuser screen 300. The waveguides of the first part 500a and the second part 500b are positioned such that the outputs of the waveguides of the first part 500a do not align with the inputs of the waveguides of the second part 500b.

First part 500a comprises a first face 504, a second face 505 substantially parallel to the first face 504. A plurality of waveguides 530a provide an optical path between the first face 504 and the second face 505 in an array. The plurality of waveguides may be substantially orthogonal to the first face 504.

A value of an optical property of each of the waveguides 530a is selected randomly from a set of values. In some examples the set of values may consist of two values, however any number of values may be appropriate. In some examples the value may be selected from a random continuous distribution of values or from discrete predefined values or from predetermined discrete values. The size of each individual waveguide of the plurality of waveguides 530a is below the size that would allow a single optical mode to propagate along the waveguide.

Second part 500b is optically coupled to the first part 500a such that the output from second face 505 is input into third face 506, and as stated above the individual inputs and outputs of the waveguides of the first part 500a and the second part 500b do not align. Second part 500b comprises third face 506, a fourth face 507 substantially parallel to the third face 506. A plurality of waveguides 530b are provide an optical path between the third face 506 and the fourth face 507. The waveguides are substantially orthogonal to the third face 506. The second face 505 and the third face 506 may be positioned as close to each other as practical depending upon the desired resolution of the image, as the obtainable resolution decreases with increasing separation.

A value of an optical property of each of the waveguides 530b is selected randomly from a set of values. In some examples the set of values may consist of two values, however any number of values may be appropriate. In some examples the value may be selected from a random continuous distribution of values or from predetermined discrete values. The size of each individual waveguide of the plurality of waveguides 530b is below the size that would allow a single optical mode to propagate along the waveguide.

In some examples the set of values may be identical for the first part 500a and the second part 500b. However, in some examples the set of values may be different, or the chance of selecting each of the set may be different. In some examples the size of each waveguide of the first part 500a and the second part 500b may be substantially the same, or may be different. The differences may be chosen based on the width of the Gaussian distribution required.

Figure 5B:
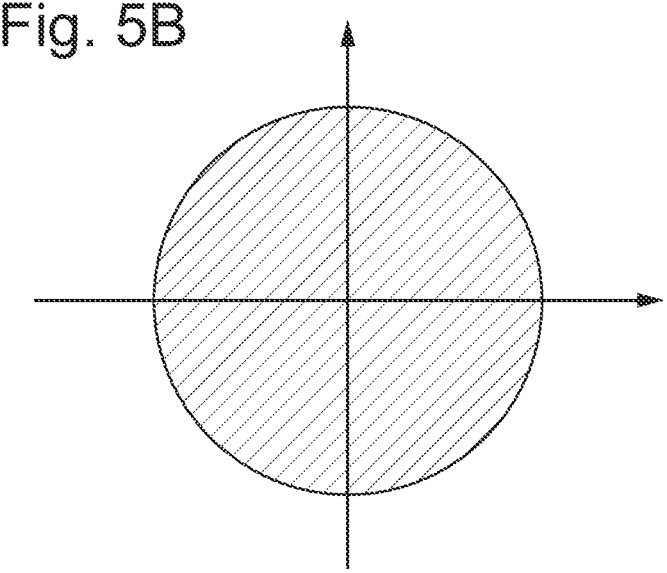
FIG. 5B illustrates an output cone angle from a double transverse Anderson localisation angled diffuser screen.

The output light 520 is output in a Gaussian or Gaussian-like distribution of angles, as illustrated in FIG. 5B, centred around a direction substantially parallel with the optical axis of the waveguides. In some examples the distribution may be a top-hat function or a super Gaussian function. This may be useful for some applications as it may result in a relatively constant luminance over part of the screen.

In some examples the input cone angle may be ±3° and the output cone angle may be ±23°.

The gap between the first part 500a and the second part 500b may be kept as small as practical. A constraint on the size of the gap may be the size of the image pixels or minimum desired feature size, as an increase in the size of the gap causes a decrease in the available resolution. As an example, if the pixel size is 4 µm then the gap should also be less than 4 µm.

In some examples the gap may be an air gap. In some examples the gap may be filled with a bonding material, such as glue. In some examples the gap may be filled with an index-matched material.

Figure 6A:
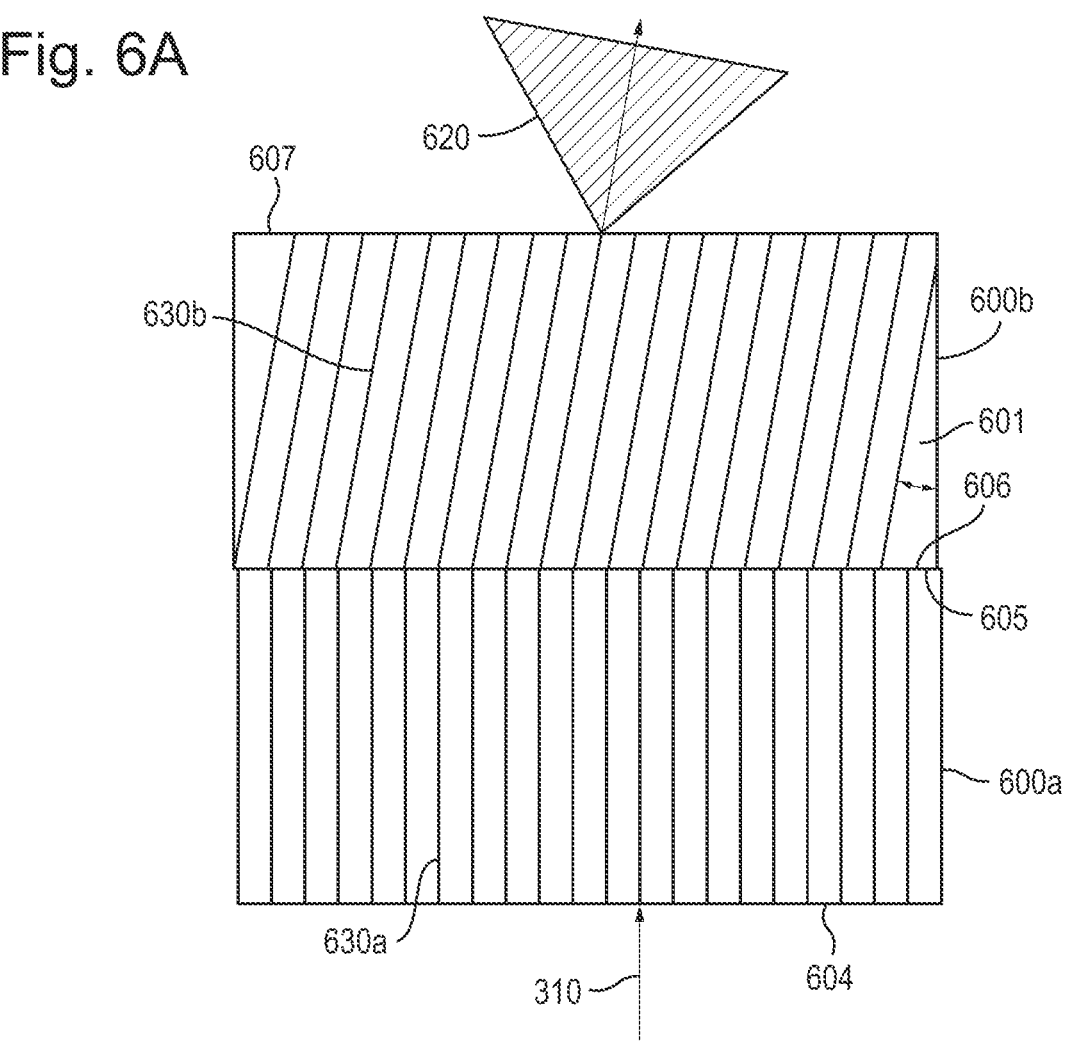
FIG. 6A illustrates a straight-angled transverse Anderson localisation diffuser screen in accordance with some examples.
Figure 6B:
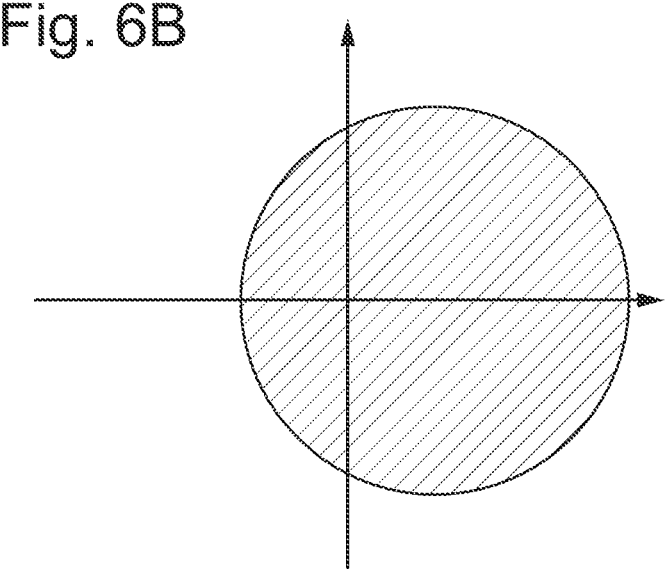
FIG. 6B illustrates an output cone angle from a straight-angled transverse Anderson localisation angled diffuser screen.

FIG. 6 illustrates a straight-angled TAL diffuser screen 600 in accordance with some examples. The straight-angled TAL diffuser screen 600 is substantially similar to the double TAL diffuser screen 500, however one of the parts comprises waveguides with optical axes that are not orthogonal to one of the faces.

The straight-angled TAL diffuser screen 600 comprises a straight part 600a and an angled part 600b. Similar to the double TAL diffuser screen 500 the individual outputs of the waveguides in the straight part 600a do not align with the inputs of the waveguides of the angled part 600b. The straight part 600a may be substantially similar to the diffusion 300 screen described in relation to FIG. 3.

Straight part 600a comprises a first face 604, a second face 605 substantially parallel to the first face 604. A plurality of waveguides 630a are arranged in an array and provide an optical path between the first face 604 and the second face 605. The optical axis of each waveguide is substantially orthogonal to the first face 604.

A value of an optical property of each of the waveguides 630a is selected randomly from a set of values. In some examples the set of values may consist of two values, however any number of values may be appropriate. In some examples the value may be selected from a random continuous distribution of values or from predetermined discrete values.

The size of each individual waveguide of the plurality of waveguides 630a is below the size that would conventionally allow a single optical mode to propagate along the waveguide without attenuation.

Angled part 600b is optically coupled to the straight part 600a such that light that is output from second face 605 is coupled into third face 606, and such that the outputs of the waveguides of the second face 605 do not align with the inputs of the waveguides of the third face 606. Angled part 600b comprises a third face 606, a fourth face 607 substantially parallel to the third face 606. A plurality of waveguides 630b arranged in an array provide an optical path between the third face 606 and the fourth face 607. The plurality of waveguides 630b are arranged such that the optical axis of the waveguides 630b is at an angle 601 relative to a normal of the plane of the third face 606 and/or fourth face 607.

A value of an optical property of each of the waveguides 630b is selected randomly from a set of values. In some examples the set of values may consist of two values, however any number of values may be appropriate. In some examples the value may be selected from a random continuous distribution of values or from predetermined discrete values. The size of each individual waveguide of the plurality of waveguides 630b is below the size that would allow a single optical mode to propagate along the waveguide.

In some examples the set of values may be identical for the straight part 600a and the angled part 600b. However, in some examples the set of values may be different, or the chance of selecting each of the set may be different. In some examples the size of each waveguide of the straight part 600a and the angled part 600b may be substantially the same, or may be different. The differences may be chosen based on the width of the Gaussian-like distribution required.

Light is input into straight-angled TAL diffuser screen 600 as input light 310 to the first face 604 of the straight part 600a. Light propagates along the straight part 600a in a similar manner to that described with relation to the TAL diffuser screen 300 of FIG. 3A. The light then enters the angled part 600b through third face 606 and propagates along the plurality of waveguides 630b. The light is then output in a Gaussian or Gaussian-like distribution of angles around a direction that is parallel to the direction of the waveguides 630b. The Gaussian-like distribution may be a top hat distribution or a super Gaussian distribution.

The angle 601 may be an acute angle. The angle may be chosen based on the offset of the Gaussian or Gaussian-like distribution that is desired, where a larger angle leads to a larger offset. A factor to consider when choosing the angle, similar to fibre faceplates, is that the output cone is changed relative to the optical axis of the waveguides based on an index change from the waveguide to air (or other medium that the light travels through).

The gap between the straight part 600a and the angled part 600b may be kept as small as practical. A constraint on the size of the gap may be the size of the image pixels or minimum desired feature size, as an increase in the size of the gap causes a decrease in the available resolution. As an example, if the pixel size is 4 µm then the gap should also be less than 4 µm.

In some examples the gap may be an air gap. In some examples the gap may be filled with a bonding material, such as glue. In some examples the gap may be filled with an index-matched material.

Figure 7A:
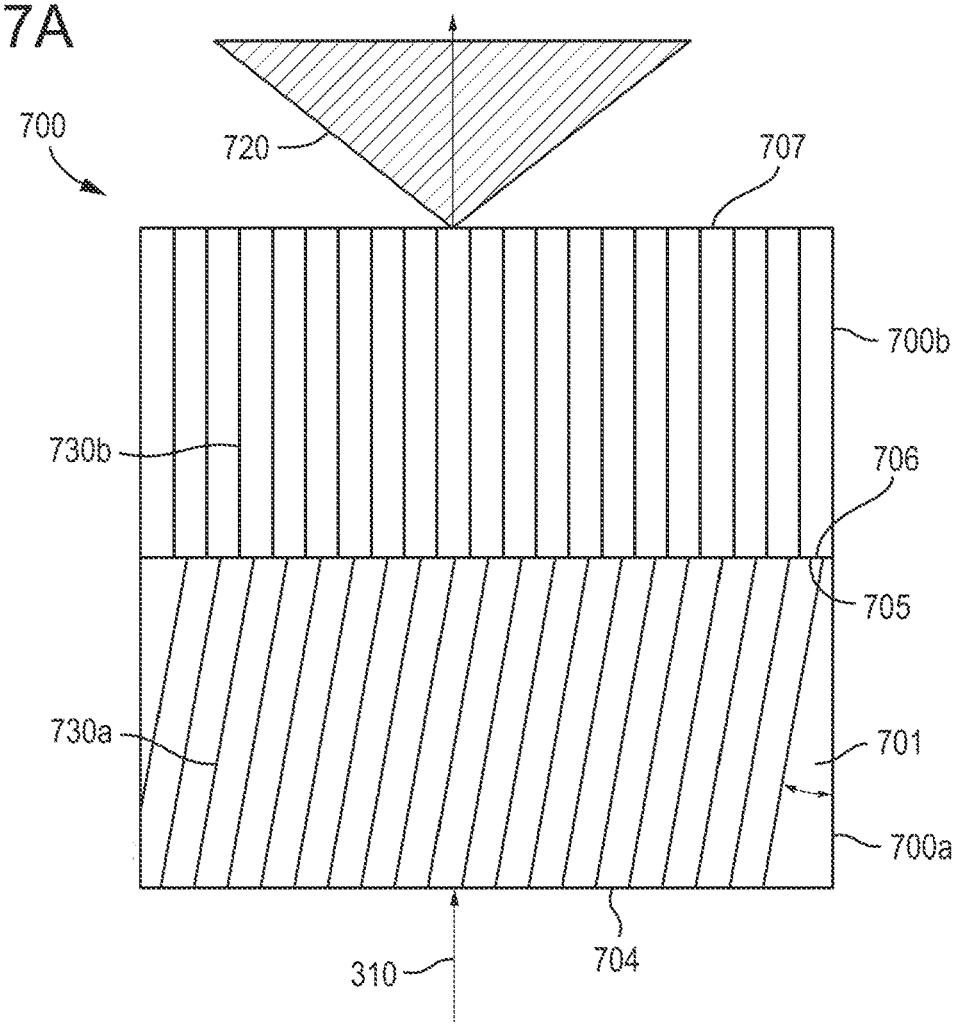
FIG. 7A illustrates an angled-straight transverse Anderson localisation diffuser screen in accordance with some examples.

FIG. 7A illustrates an angled-straight TAL diffuser screen 700, which is a variation of the arrangements of FIGS. 5A and 6A. Angled-straight TAL diffuser screen 700 comprises an angled part 700a and a straight part 700b. Similar to arrangements of FIGS. 5A and 6A the outputs of the waveguides of the angled part 700a do not align with the inputs of the waveguides of the straight part 700b. Angled part 700a comprises a first face 704 and a second face 705. A plurality of waveguides 730a arranged in an array provide an optical path between the first face 704 and the second face

705. The plurality of waveguides have an optical axis that is at an angle 701 to a normal of the plane of the first face 704 and/or second face 705.

A value of an optical property of each of the waveguides 730*a* is selected randomly from a set of values. In some examples the set of values may consist of two values, however any number of values may be appropriate. In some examples the value may be selected from a random continuous distribution of values or from predetermined discrete values.

The size of each individual waveguide of the plurality of waveguides 730*a* is below the size that would allow a single optical mode to propagate along the waveguide.

Straight part 700*b* comprises a third face 706 and a third face 707. A plurality of waveguides 730*b* are located in an optical path between the third face 706 and the fourth face 707. The plurality of waveguides 730*b* are substantially orthogonal to the third face 706 and/or fourth face 707.

A value of an optical property of each of the waveguides 730*b* is selected randomly from a set of values. In some examples the set of values may consist of two values, however any number of values may be appropriate. In some examples the value may be selected from a random continuous distribution of values or from predetermined discrete values.

The size of each individual waveguide of the plurality of waveguides 730*b* is below the size that would allow a single optical mode to propagate along the waveguide.

Straight part 700*b* is optically coupled to angled part 700*a*, such that light may propagate between the angled part 700*a* and the straight part 700*b*. Light is input as input light 310 into angled part 700*a* via the first face 704. The light propagates along the plurality of waveguides 730*a* and output into the straight part 700*b*. The light propagates through angled part 700*a* in a similar manner to that of offset diffuser screen 400 described with relation to FIG. 4. The light is output with in a range of angles, the range having a Gaussian profile, around a direction parallel with the optical axis of the waveguides 730*a*.

The output light is then input into straight part 700*b*. As the input light into straight part 700*b* is not at 90° to the surface the light is spread through the plurality of waveguides 730*b* which further increases the width of the output light 720 from the fourth face. The straight part 700*b* also behaves like the TAL diffuser screen 300 described in relation to FIG. 3.

Figure 7B:
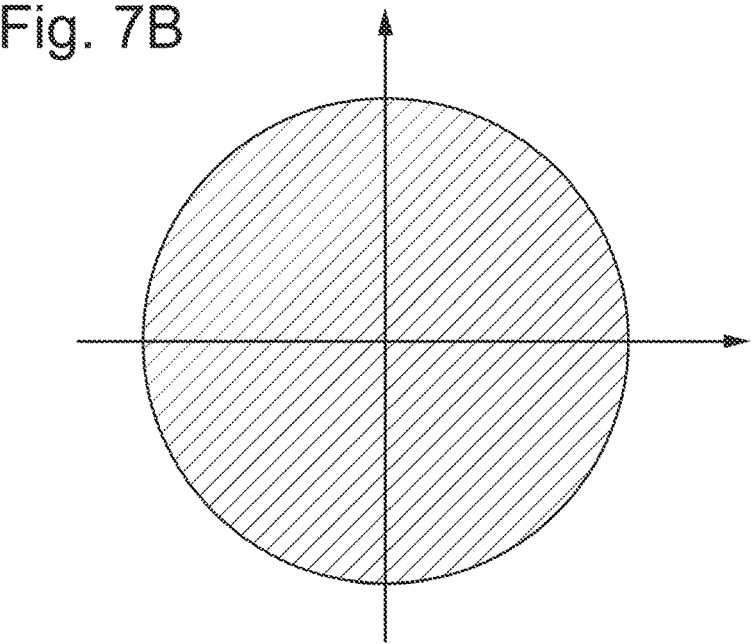
FIG. 7B illustrates an output cone angle from an angled-straight transverse Anderson localisation angled diffuser screen.

By increasing the angle 701 of the plurality of waveguides 730*a* the width of the Gaussian or Gaussian-like profile may be increased. The example profile is illustrated in FIG. 7B, which shows that the profile is symmetrical with no offset, in contrast with the arrangement of FIG. 6A. The Gaussian-like profile may comprise a top hat distribution or a super Gaussian distribution.

The gap between the angled part 700*a* and the straight part 700*b* may be kept as small as practical. A constraint on the size of the gap may be the size of the image pixels or minimum desired feature size, as an increase in the size of the gap causes a decrease in the available resolution. As an example, if the pixel size is 4 μm then the gap should also be less than 4 μm.

In some examples the gap may be an air gap. In some examples the gap may be filled with a bonding material, such as glue. In some examples the gap may be filled with an index-matched material.

FIGS. 3-7 show TAL diffuser screens with a plurality of waveguides substantially parallel to each other and substantially straight, i.e. the optical axis is substantially parallel. However, the waveguides may have an optical axis that is substantially parallel to their nearest neighbours, but not parallel to every waveguide in the TAL diffuser screen. The waveguides are also not required to be straight or substantially straight. For example a first waveguide may be perpendicular to the first face, and the angle relative to a normal of the first face may increase with distance from the first waveguide. The angle may stay constant in one dimension in the plane of the first face, or may vary in two dimensions in the plane of the first face. In some examples the angle may also vary in the dimension along the waveguide, such that the waveguides are curved. The waveguides may have the same curvature, or the curvature may vary by waveguide.

Figure 8:
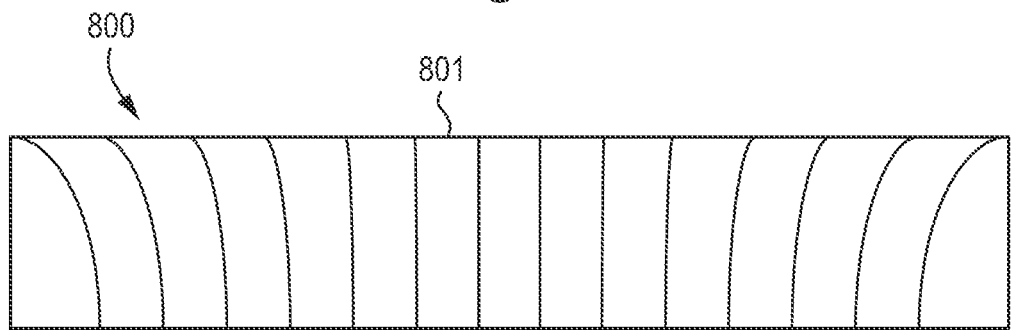
FIG. 8 illustrates a variable offset transverse Anderson localisation diffuser screen according to some examples.

An example is illustrated by FIG. 8. FIG. 8 illustrates a variable offset TAL diffuser screen 800 where not all the waveguides are parallel to each other. A result of such a structure is that the cone angle offset varies with position, such that there is substantially no offset in the centre 801 of the variable offset TAL diffuser screen 800 and an increasing offset outside of the centre 801.

FIGS. 3-7 show the input light as a single straight ray. However, the input light may be input in a range of angles, for example ±3°. Furthermore, the light input may be input as an image over a finite area of the TAL diffuser screen, i.e. a supposition of single rays. The output would be a supposition of cones, conserving or increasing the size of the image that is output compared to the input image.

FIGS. 5-7 illustrate 2 TAL diffuser screens being stacked, however, any number of screens in any arrangement may be stacked, depending upon the required characteristics.

In some examples the TAL diffuser screen may be bonded to a glass substrate.

The faces of the TAL diffuser screens are shown as being substantially straight, however in some examples the at least one of the faces may be curved.

The array of waveguides described in relation to FIGS. 3A-7B may comprise a photonic crystal structure, such that each waveguide comprises a hole in a lattice structure. In some examples the holes may be filled with air. In some examples the holes may be filled with a solid material, such as a plastic or silicon based material.

The overall thickness of the diffuser screen according to some examples, such as those described in reference to FIGS. 3-8 may depend upon the specific application and size of waveguide, where are larger waveguide may require a thicker screen. In some examples the diffuser screen thickness may be between 0.25 mm and 1.5 mm. In some examples the diffuser screen thickness may be between 0.5 mm and 1 mm.

Figure 9:
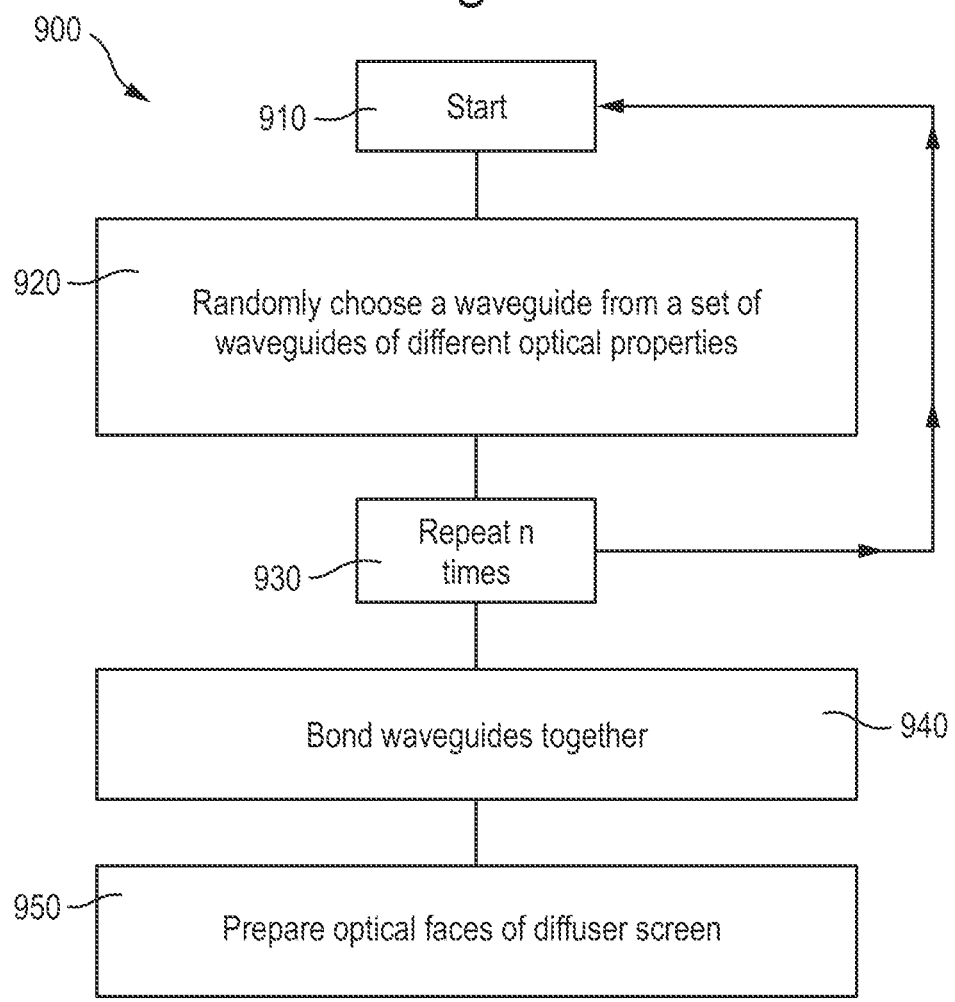
FIG. 9 illustrates a method to fabricate a transverse Anderson localisation fibre diffuser screen according to some examples.

FIG. 9 illustrates a method to fabricate a TAL fibre diffuser screen according to some examples. The method is indicated with reference sign 900.

The method begins at start 910. A waveguide is chosen at random from a set of waveguides 920. The set of waveguides comprises a first subset comprising a plurality of waveguides having a first value of an optical property and a second subset comprising a plurality of waveguides having a second value of the optical property, the first value and second value being different. There may any number of subsets each comprising a different value of the optical property.

Selection of the waveguides is repeated n times 930 in total, such that there are n waveguides chosen, each waveguide having a value of the optical property that is one of a predetermined number of values.

The waveguides are then bonded or fused together 840. In some examples this may comprise sintering and drawing out the waveguides. Some of the waveguides will melt, and some will stay complete, further adding to the randomness of the screen.

The optical faces of the diffuser screens are prepared 850. In some examples this may comprise polishing the faces such that they are optically smooth.

In some examples the output or input faces of the waveguides may be at least substantially curved as appropriate for the optics to which it is attached. By using non-flat surfaces field flatness of imaging optics may be cured or mitigated.

Example 1

A diffuser screen utilising transverse Anderson localization was fabricated, the diffuser screen herein referred to as the test screen. The test screen comprised two 24 mm diameter, 0.5 mm thick, Nanoguide faceplates, manufactured by Incom, 294 Southbridge Road, Charlton, MA 01507. The faceplates were bonded together using EPO-TEK 301-LP glue, EPO-TEK 301-LP is a glue made by Epoxy Technology, Inc., 14 Fortune Drive, Billerica, MA 01821. The bonded Nanoguide screens were bonded to a 1 mm thick glass substrate, the glass substrate comprising an anti-reflection coating on one side. Both Incom Nanoguide screens comprised waveguides having an optical axis perpendicular to the substrate surface. The final diameter of the test screen was less than 25 mm.

The test screen was compared to a reference screen, which was a high resolution screen used on helmet mounted displays based on diffractive technology similar to that described with relation to FIGS. 1 and 2 and a separate diffuser.

Figure 10A:
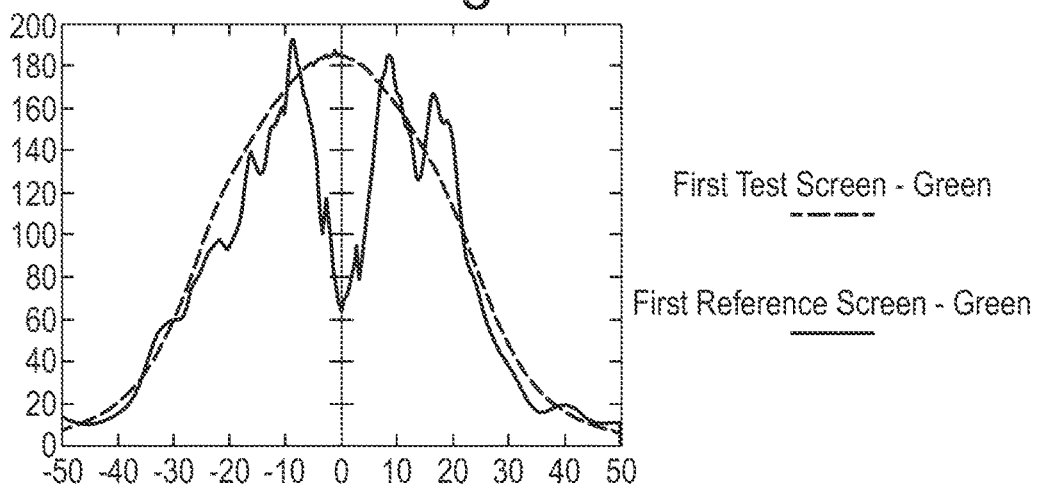
FIGS. 10A-10C illustrate power against angle of emission for green, red and blue light for both a reference and test screen.
Figure 10B:
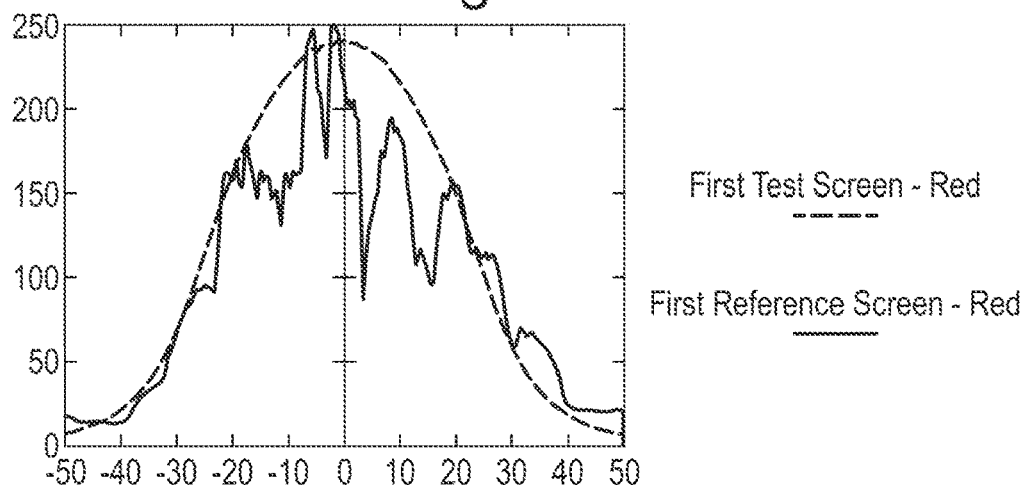
Figure 10C:
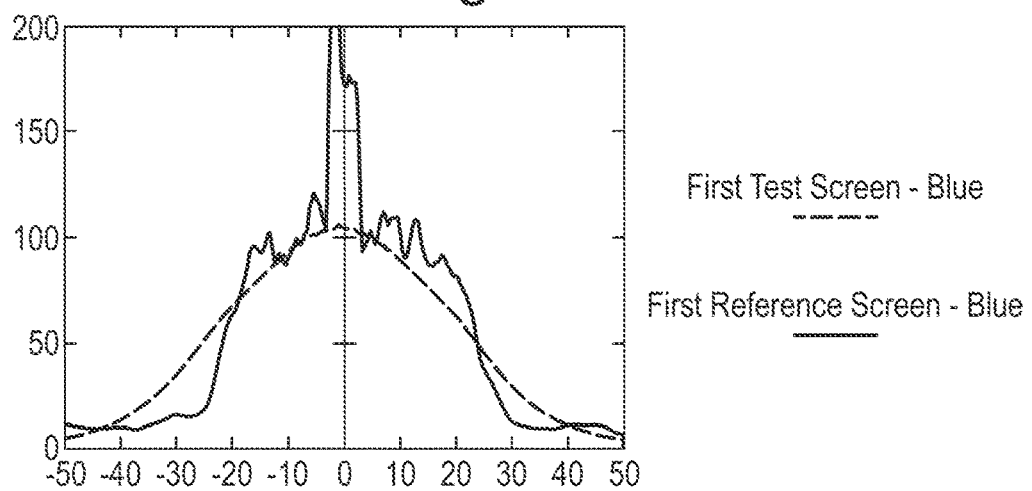

FIGS. 10A-10C illustrate comparisons of cone angles for the test screen and reference screen for red, green and blue light.

FIG. 10A illustrates the cone angle for green light of both the test and reference screen. FIG. 9B illustrates the cone angle for red light of both the test and reference screen. FIG. 9C illustrates the cone angle for blue light of both the test and reference screen.

The test screen is either similar to the conventional screen (red and green light) or better (blue light) but without any of the peaks and troughs.

As can be seen from FIGS. 10A-10C the test diffuser screen gives an approximately Gaussian profile with a very similar linewidth for each colour. The intensities are different as each light source used in the testing has a different input power, and therefore the measured output power is different.

FIG. 10D illustrates a plot of cone angles for green, blue and red light against normalised power for the test screen. This demonstrates that the profiles are indeed very similar. As the RGB cone angles are virtually identical there should be no varying colour balance issues across the field of view or eyebox.

Figure 11A:
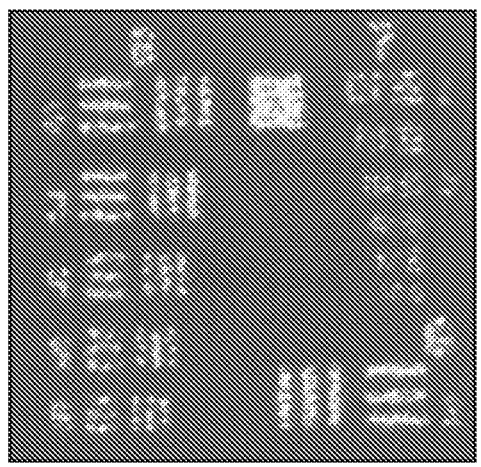
FIG. 11A shows a resolution test of the reference screen for green light.

FIG. 11A shows a resolution test of the reference screen for green light. FIG. 10B shows a resolution test for the test screen using green light. FIG. 10C shows a resolution test for the test screen for red light.

Figure 11B:
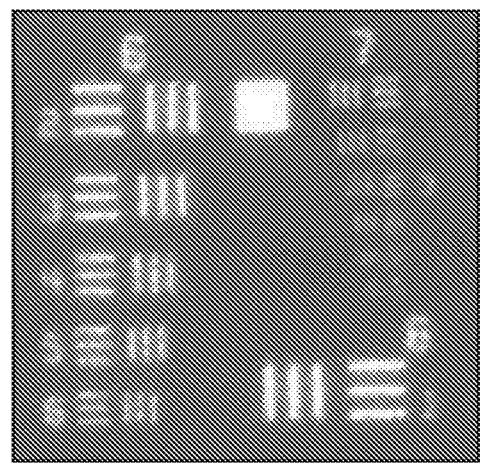
FIG. 11B shows a resolution test for the test screen using green light.
Figure 11C:
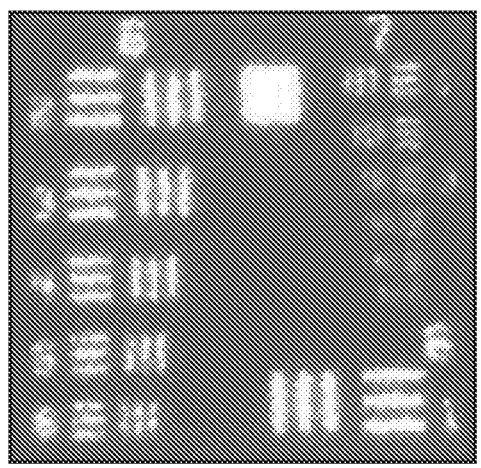
FIG. 11C shows a resolution test for the test screen for red light.

As can be seen from FIG. 11A, the resolution ranges from 6.6 to 7.1 over the area of the reference screen. However, for the same colour in FIG. 11B the resolution ranges from 7.4 to 7.6 over the area of the test screen. For the test screen using red light, the resolution is 7.3. Overall, for the diffuser screen using transverse Anderson localization the resolution is better than 181 cy/mm for the green and blue light, and 161 cy/mm for red light.

Example 2

A 5 mm×5 mm second test screen was fabricated using a Nanoguide faceplate. The waveguides of the screen were substantially perpendicular to the face of the screen, and the faceplate was substantially flat (i.e. substantially similar to FIG. 3A). The second test screen was compared to a standard screen used in many HUD applications (second reference screen) comprising a fibre faceplate and a separate diffuser screen. Green light was input at a ±3° input angle to both the second test screen and second reference screen.

Figure 12A:
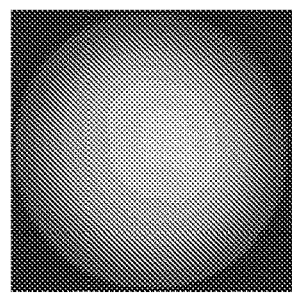
FIG. 12A shows the variation intensity across various cone angles for the second reference screen.
Figure 12B:
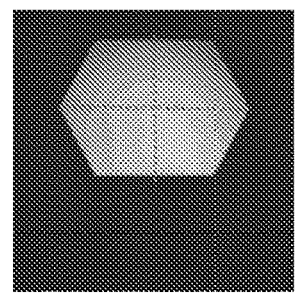
FIG. 12B shows the cone angle masked for an application of a head up display.

FIG. 12A shows the variation intensity across various cone angles for the second reference screen and FIG. 12B shows the cone angle masked for an application of a HUD.

Figure 12C:
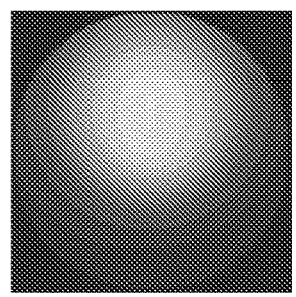
FIG. 12C shows the variation intensity across various cone angles for the second test screen.
Figure 12D:
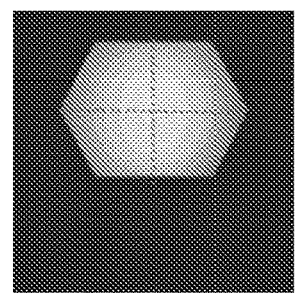
FIG. 12D shows the cone angle masked for an application of a head mounted display.

FIG. 12C shows the variation intensity across various cone angles for the second test screen and FIG. 12D shows the cone angle masked for an application of a HUD.

Figure 12E:
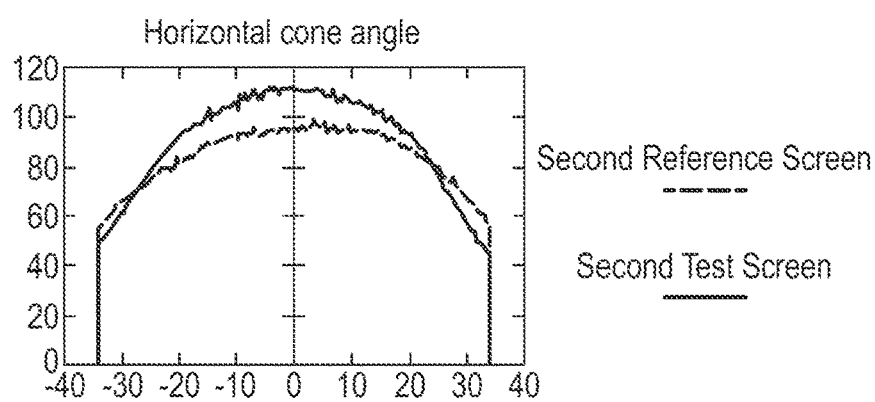
FIG. 12E shows the horizontal cone angle of FIGS. 12B and 12D plotted against intensity.
Figure 12F:
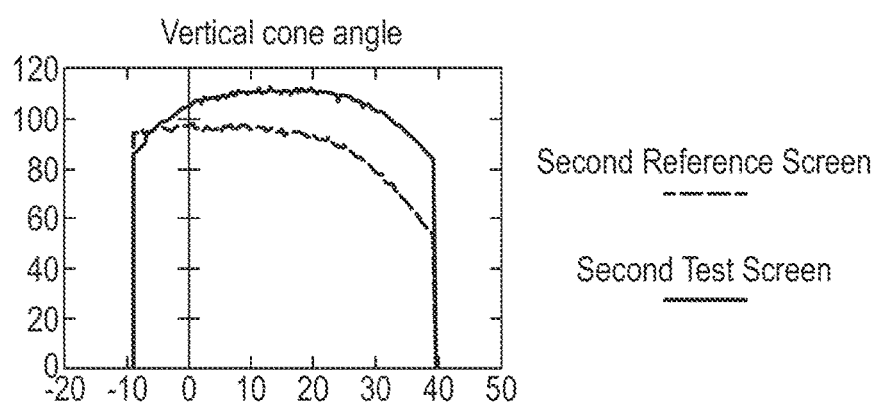
FIG. 12F shows the vertical cone angle of FIGS. 12B and 12D plotted against intensity.

The dashed lines in FIGS. 12B and 12D indicate the position of the cone angle plots in FIGS. 12E and 12F. FIG. 12E shows the horizontal cone angle plotted against intensity. FIG. 12F shows the vertical cone angle plotted against intensity. As can be seen from the figures, the second test screen is approximately 20% brighter at centre of used cone.

The second test screen also was demonstrated to have a 128 cy/mm resolution using a USAF pattern projected through the second test screen. This is in comparison with the second reference screen which has a resolution of 57 cy/mm.

The granularity of the second test screen and second reference screen were measured by analysing a high resolution image of an evenly illuminated screen.

Figure 13A:
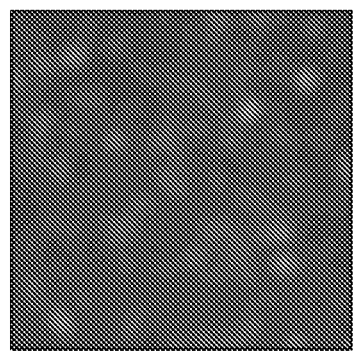
FIGS. 13A-C illustrate the granularity of the second test and second reference screen.
Figure 13B:
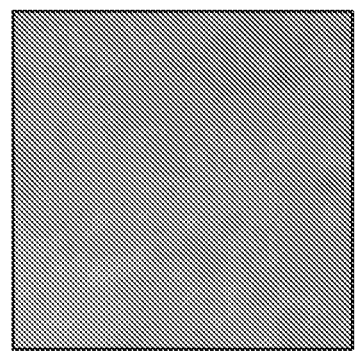

FIG. 13A shows the granularity of a 0.2 mm×0.2 mm section of the image displayed by the reference screen. FIG. 13B shows the granularity of a 0.2 mm×0.2 mm section of the image displayed by the test screen.

Figure 13C:
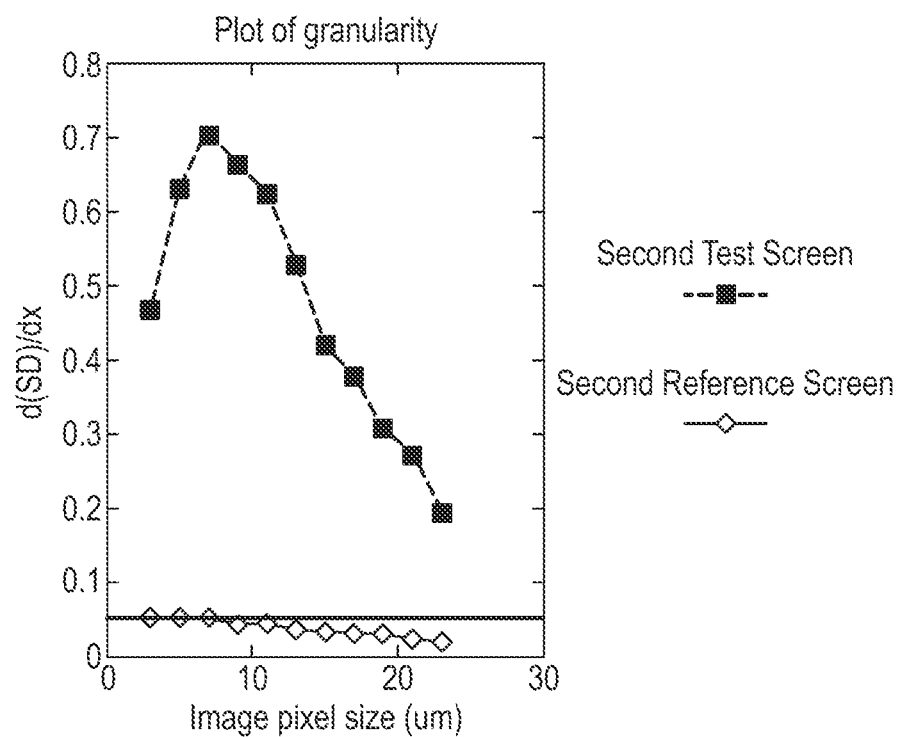

FIG. 13C shows a plot of the rate of change of greyscale standard deviation against image pixel size for the second reference screen and the second test screen. The image pixel size is changed by re-scaling the image resolution to that indicated on the horizontal axis of FIG. 13C. The first point on the graph is at 3 μm, i.e. the start image resolution pixel size was 3 μm. The last point is at 23 μm so the end picture resolution pixel size was increased to 23 μm.

Figure 14:
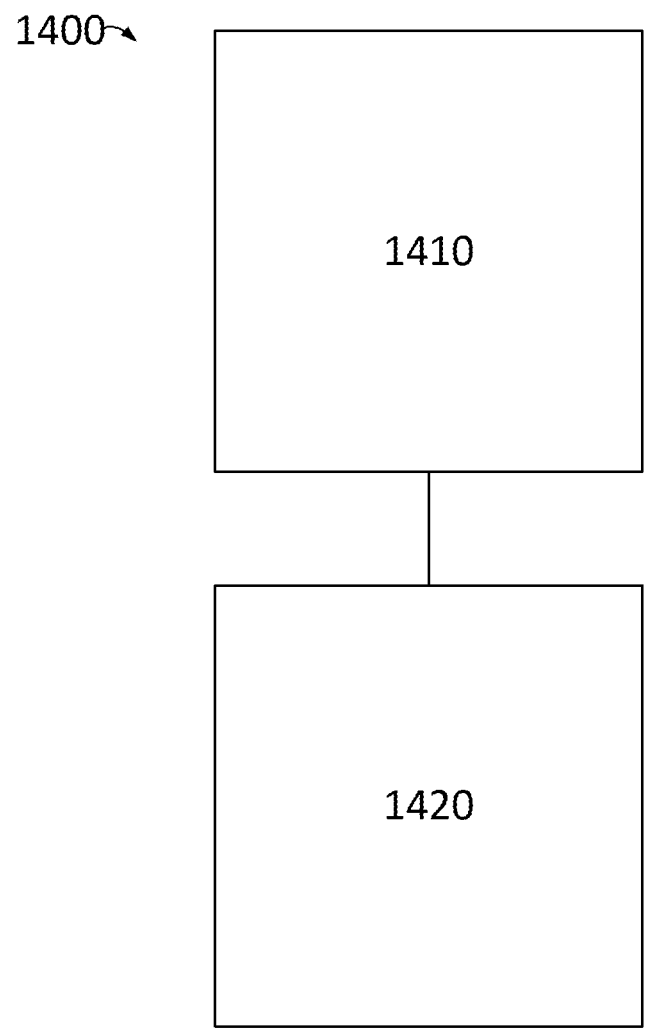
FIG. 14 illustrates an optical apparatus in accordance with some examples.

FIG. 14 illustrates an optical apparatus 1400 according to some examples. Optical apparatus 1400 comprises an image source 1410 to generate an image bearing light beam, the image bearing light beam having a first numerical aperture; and a diffuser screen 1420 for increasing the numerical aperture of the image bearing light beam to a second numerical aperture. The diffuser screen 1420 is substantially similar to the transverse Anderson localization diffuser screen described with reference to FIGS. 3A to 13C. As described above, use of the transverse Anderson localization (TAL) diffuser screen allows for an increase in resolution compared to fibre faceplates, whilst simultaneously providing an increase in the numerical aperture.

The optical apparatus may be used in at least a head up display or a head worn display. In some examples the numerical aperture of the input beam may be within the range of 0.05 to 0.1 and the increased numerical aperture of the output beam may be more than 0.35. In some examples the output numerical aperture of the beam may be more than double the input numerical aperture.

In some examples the display may comprise a head mounted display, such as a helmet mounted display, and the input light numerical aperture may be approximately 0.1 and the output numerical aperture may be approximately 0.35.

In some examples the display may comprise a head up display, and the input light numerical aperture may be approximately 0.05 and the output numerical aperture may be approximately 0.5.

The invention claimed is:

1. An optical apparatus to display an image to a user, the apparatus comprising:
   an image source to generate an image bearing light beam, the image bearing light beam having a first numerical aperture; and
   a diffuser screen configured to increase the first numerical aperture of the image bearing light beam to a second numerical aperture, the diffuser screen including a part to receive the image bearing light beam, the part including
      a first face and second face substantially parallel to each other, and
      an array of waveguides forming a continuous optical path between the first face and the second face,
      wherein a first waveguide of the array of waveguides has a first width and a first refractive index, and a second waveguide of the array of waveguides has a second width different from the first width, and a second refractive index different from the first refractive index
      and
      wherein the array of waveguides is arranged such that each of the waveguides has an optical axis that is substantially parallel to its nearest neighbor.

2. The optical apparatus according to claim 1, wherein each waveguide of the array is arranged such that the optical axes of each waveguide of the array are substantially parallel to each other.

3. The optical apparatus according to claim 1, wherein the part of the diffuser screen to receive the image is a first part of the diffuser screen, and the array of waveguides is a first array of waveguides, the diffuser screen further comprising:
   a second part including a third face and a fourth face substantially parallel to the first face; and
   a second array of waveguides forming an optical path between the third face and the fourth face;
   wherein a first waveguide of the second array of waveguides has a third width and a third refractive index, and a second waveguide of the second array of waveguides has a fourth width different from the third width, and a fourth refractive index different from the third refractive index
   and
   wherein the second array of waveguides is arranged such that each of the waveguides of the second array has an optical axis that is substantially parallel to its nearest neighbor, and the first part and second part are coupled together to allow the image bearing light beam to propagate between the second face and the third face.

4. The optical apparatus according to claim 3, wherein each waveguide of the second array is arranged such that the optical axes of each waveguide of the second array are substantially parallel to each other.

5. The optical apparatus according to claim 3, wherein at least one of the first array and second array of waveguides comprises a photonic crystal structure.

6. The optical apparatus according to claim 5, wherein the photonic crystal structure comprises a photonic crystal structure of holes.

7. The optical apparatus according to claim 3, wherein a separation of the third face and the fourth face is in a range of 0.25 mm to 1.5 mm.

8. The optical apparatus according to claim 3, wherein an angle between an overall optical axis of the first array and an overall optical axis of the second array is between 0° and 45°.

9. The optical apparatus according to claim 8, wherein the angle is substantially 10°.

10. The optical apparatus according to claim 3, wherein at least one of the third face and fourth face are at least partially curved.

11. The optical apparatus according to claim 1, wherein a separation of the first face and the second face is in a range of 0.25 mm to 1.5 mm.

12. The optical apparatus according to claim 1, wherein a length of each of the waveguides is between 0.25 mm and 1.5 mm.

13. The optical apparatus according to claim 1, wherein the diffuser screen is bonded to a glass substrate.

14. The optical apparatus according to claim 13, wherein the glass substrate thickness is 1 mm.

15. The optical apparatus according to claim 1, wherein a diameter of each waveguide is less than 4 μm.

16. The optical apparatus according to claim 1, wherein at least one of the first face and second face are at least partially curved.

17. The optical apparatus according to claim 1, wherein the second numerical aperture is more than double the first numerical aperture.

18. The optical apparatus according to claim 1, wherein the first numerical aperture is within the range of 0.05 to 0.1 and the second numerical aperture is more than 0.35.

19. A head up display comprising an optical apparatus according to claim 1.

20. A head worn display comprising an optical apparatus according to claim 1.

21. An optical apparatus to display an image to a user, the apparatus comprising:
   an image source to generate an image bearing light beam, the image bearing light beam having a first numerical aperture; and
   a diffuser screen configured to increase the first numerical aperture of the image bearing light beam to a second numerical aperture, the diffuser screen including a part to
      receive the image bearing light beam, the part including
         a first face and second face substantially parallel to each other, and
         an array of waveguides forming a continuous optical path between the first face and the second face,
         wherein a first waveguide of the array of waveguides has a first size and a first refractive index, and a second waveguide of the array of waveguides has a second size different from the first size or has a second refractive index different from the first refractive index, and
         wherein the array of waveguides is arranged such that each of the waveguides has an optical axis that is substantially parallel to its nearest neighbor.

22. A method of designing a diffuser screen, the diffuser screen having a first face and second face substantially parallel to each other, the method comprising:
- randomly selecting a value of at least one optical property of each waveguide of a plurality of waveguides; and
- arranging the plurality of waveguides such that each of the waveguides has an optical axis that is substantially parallel to its nearest neighbor, the plurality of waveguides forming a continuous optical path between the first face and the second face of the diffuser screen.

23. The method of claim 22, wherein the at least one optical property is a waveguide size or a refractive index.

24. The method of claim 22, wherein randomly selecting a value of at least one optical property comprises randomly selecting the value from a finite set of values.

* * * * *